United States Patent [19]

Hackbarth et al.

[11] Patent Number: 5,170,432
[45] Date of Patent: Dec. 8, 1992

[54] METHOD OF SPEAKER ADAPTIVE SPEECH RECOGNITION

[75] Inventors: Heidi Hackbarth, Stuttgart; Manfred Immendorfer, Ditzingen, both of Fed. Rep. of Germany

[73] Assignee: Alcatel N.V., Amsterdam, Netherlands

[21] Appl. No.: 586,086

[22] Filed: Sep. 21, 1990

[30] Foreign Application Priority Data

Sep. 22, 1989 [DE] Fed. Rep. of Germany ....... 3931638

[51] Int. Cl.⁵ .......................... G10L 5/06; G10L 5/00
[52] U.S. Cl. ........................................ 381/43; 381/41
[58] Field of Search ................................ 381/41–43

[56] References Cited

U.S. PATENT DOCUMENTS

| | | | |
|---|---|---|---|
| 4,748,670 | 5/1988 | Bahl et al. | 381/43 |
| 4,780,906 | 10/1988 | Rajasekaran et al. | 381/43 |
| 4,866,778 | 9/1989 | Baker | 381/43 |
| 4,882,757 | 11/1989 | Fisher et al. | 381/43 |
| 4,941,178 | 7/1990 | Chuang | 381/43 |

OTHER PUBLICATIONS

Speech Technology, vol. 4, No. 4 Apr./May 1989, "Progress in Large Vocabulary Speech Recognition," by F. Fallside, pp. 14–15.

Lexical Access And Verification In A Broad Phonetic Approach To Continuous Digit Recognition, F. R. Chen pp. 21.7.1-21.7.4, IEEE ICASSP (1986).

A Coarse Phonetic Knowledge Source for Template Independent Large Vocabulary Word Recognition, H. La-ger & A. Waibel pp. 23.6.1-23.6.3, IEEE ICASSP (2), (1985).

"Fast Feature-Based Preclassification of Segments In Continuous Digit Recognition" D. Lubensky & W. Feix, pp. 21.6.1-21.6.4, IEEE ICASSP, (1986).

Int. Conf. on Dig. Signal Proc., "Three-Dimensional DP for Phonetic Lattice Matching", G. Micca, R. Pieraccini & P. Laface, (1987), Fierence, Italy.

Fesseler et al., "Automatic Vocabulary Extension for a Speaker-Adaptive Speech Recognition System based on CVC Units", Eurospeech 89, Stuttgart, Germany, Sep. 1989, pp. 075–078.

Su, "Acoustic-Phonetic Recognition of Continuous Speech Using Vector Quantization; Adaptation of the Dictionary to a Speaker", Signal Processing, No. 4, Jun. 1988, pp. 388–389.

Togawa et al., "Voice-Activated Word Processor with Automatic Learning for Dynamic Optimization of Syllable-Templates", ICASSP 86 Proceedings, Apr. 1986, Tokyo, Japan, pp. 1121–1124.

*Primary Examiner*—Dale M. Shaw
*Assistant Examiner*—Kee M. Tung
*Attorney, Agent, or Firm*—Spencer, Frank & Schneider

[57] ABSTRACT

A method for recognizing spoken words of a speech includes extracting feature vectors from a speech signal which corresponds to a spoken phrase, and segmenting and classifying the successive extracted feature vectors into syllable oriented word subunits by means of a stored supply of word subunits to form a set of hypotheses. The set of hypotheses is used to generate, by three dimensional time dynamic comparison, a set of word hypotheses by comparing the segmented and classified word subunits with standard pronunciations and pronunciation variants of a plurality of words stored in a reference pattern vocabulary. The generated set of word hypotheses are then subjected to syntactic analysis to determine the spoken phrase.

8 Claims, 3 Drawing Sheets

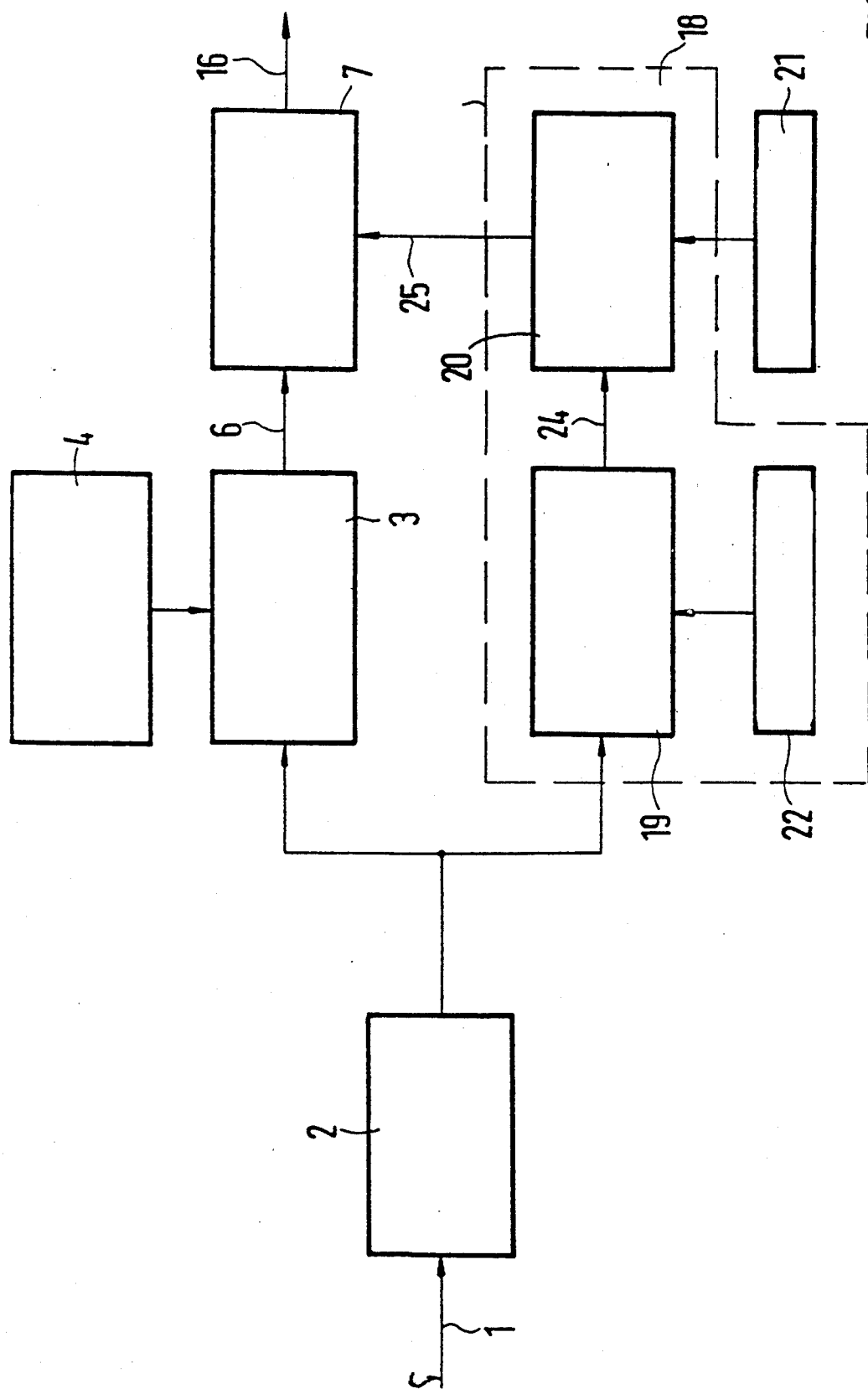

METHOD OF SPEAKER ADAPTIVE SPEECH RECOGNITION

CROSS REFERENCE TO RELATED APPLICATION

This application claims the priority of application Ser. No. P 39 31 638.6, filed Sep. 22, 1989, in the Federal Republic of Germany, the subject matter of which is incorporated herein by reference.

BACKGROUND OF THE INVENTION

The invention relates to a method for the speaker adaptive recognition of speech. Among others, an efficient speech recognition method must meet the following requirements: isolated words as well as a flowing speech text must be recognized. Even with very large vocabularies, recognition should take place in real time if possible. Fast adaptation to a new speaker is necessary. It should be possible to arbitrarily generate reference words and expand the vocabulary without (possibly repeated) sample-speaking of the added words. Variations in pronunciation of individual words must be able to be generated automatically and without explicit sample-speaking of these variants. In flowing speech, an analysis of overlapping word hypotheses should make possible the recognition of the spoken phrase.

The known methods of recognizing speech from a large vocabulary (IBM, Dragon, AT&T, BBN, Carnegie Mellon University (CMU)/Pittsburgh; overview article by F. Fallside, entitled "Progress in Large Vocabulary Speech Recognition," *Speech Technology* Vol. 4, number 4, (1989), pages 14–15), employ primarily hidden-Markov models based on phonemes. None of these systems includes an automatic vocabulary generation or expansion from written text. In the IBM and Dragon recognizers, the words must be spoken separately while the AT&T, BBN and CMU recognizers do not operate in a speaker adaptive manner.

Conventionally, each word—in the case of speaker dependent recognition—must be pronounced once or repeatedly by the user and—in the case of speaker independent recognition—must additionally be pronounced at least once by a very large number of speakers (order of magnitude from 100 to 1000). Such a complicated training procedure can be avoided if speaker adaptive methods are employed. With increasing vocabulary sizes it is necessary, with respect to speech recognition close to real time, to quickly and without extensive computation compile a short list of probably spoken "word candidates". From this sub-vocabulary of word candidates, the spoken words are then determined in the course of a fine analysis. Such a preselection is based on the classification of coarse features in word subunits, for example in individual feature vectors, phonemes or diphones. For separately spoken words—also from large vocabularies—and for sequences of digits (see F. R. Chen, "Lexical Access And Verification In A Broad Phonetic Approach To Continuous Digit Recognition", *IEEE ICASSP* (1986), pages 21.7.1-4; H. Lagger and A. Waibel, "A Coarse Phonetic Knowledge Source For Template Independent Large Vocabulary Word Recognition", *IEEE ICASSP(2)*, (1985), pages 23.6.1-4; D. Lubensky and W. Feix, "Fast Feature-Based Pre-classification Of Segments In Continuous Digit Recognition", *IEEE ICASSP*, (1986), pages 21.6.1-4), this constitutes a practicable method. However, for continuously voiced speech and a larger vocabulary, this leads to an unmanageable flood of hypotheses already for average vocabulary sizes since, in principle, a new word may start at any one of these small units and the entire supply of words would have to be searched for each unit. Two- or three-dimensional dynamic programming is known from G. Micca, R. Pieraccini and P. Laface, "Three-Dimensional DP For Phonetic Lattice Matching", *Int. Conf. on Dig. Signal Proc.*, (1987), Firence, Italy; and from G. Ruske and W. Weigel, "Dynamische Programmierung auf der Basis silbenorientierter Einheiten zur automatischen Erkennung gesprochener Sätze" [Dynamic Programming Based On Syllable Oriented Units For The Automatic Recognition Of Spoken Sentences], *NTG-Fachberichte* 94, (1986), Sprachkommunikation [Speech Communication], pages 91–96.

In the prior art methods, the above-mentioned requirements are not met completely and sometimes not quite satisfactorily.

SUMMARY OF THE INVENTION

It is an object of the invention to provide a method for the speaker adaptive recognition of speech which is able to recognize in close to real time isolated words as well as continuous speech with a practically unlimited vocabulary and which also meets the further requirements for an efficient speech recognition method.

This is accomplished by the invention with a speaker adaptive speech recognition method comprising the steps of extracting feature vectors from a speech signal corresponding to a spoken phrase to be recognized, segmenting and classifying the successive extracted feature vectors into syllable oriented word subunits by means of a stored supply of word subunits to form a set of hypotheses, comparing the set of hypotheses formed from the segmented and classified word subunits with pronunciation variants stored in a reference pattern vocabulary occurring over a three-dimensional time dynamic period to generate a set of word hypotheses, and subjecting the generated set of word hypotheses to syntactic analysis in order to determine the spoken phrase.

The advantages of the invention lie particularly in that the word recognition method is distinguished by the robustness of the word pattern where there is faulty syllable segmentation and variable pronunciation, for example when syllables are swallowed. Further, with the method according to the invention it is not necessary to explicitly sample-speak large reference vocabularies. Additionally, the word recognition system according to the invention can be quickly adaptable to a new speaker and can permit, in principle, arbitrary generation and expansion of the vocabulary from written text without explicit system training by sample-speaking. Compared to the usually employed phonemes, the syllable oriented word subunits employed in the method according to the invention permit more efficient generation of word hypotheses.

BRIEF DESCRIPTION OF THE DRAWINGS

One embodiment of the invention will now be described with reference to the drawing figures. It is shown in:

FIG. 3, a function diagram to explain the acoustic preselection of a sub-vocabulary in the recognition of isolated words or flowing speech.

DETAILED DESCRIPTION OF THE PREFERRED EMBODIMENT

Figure 1:
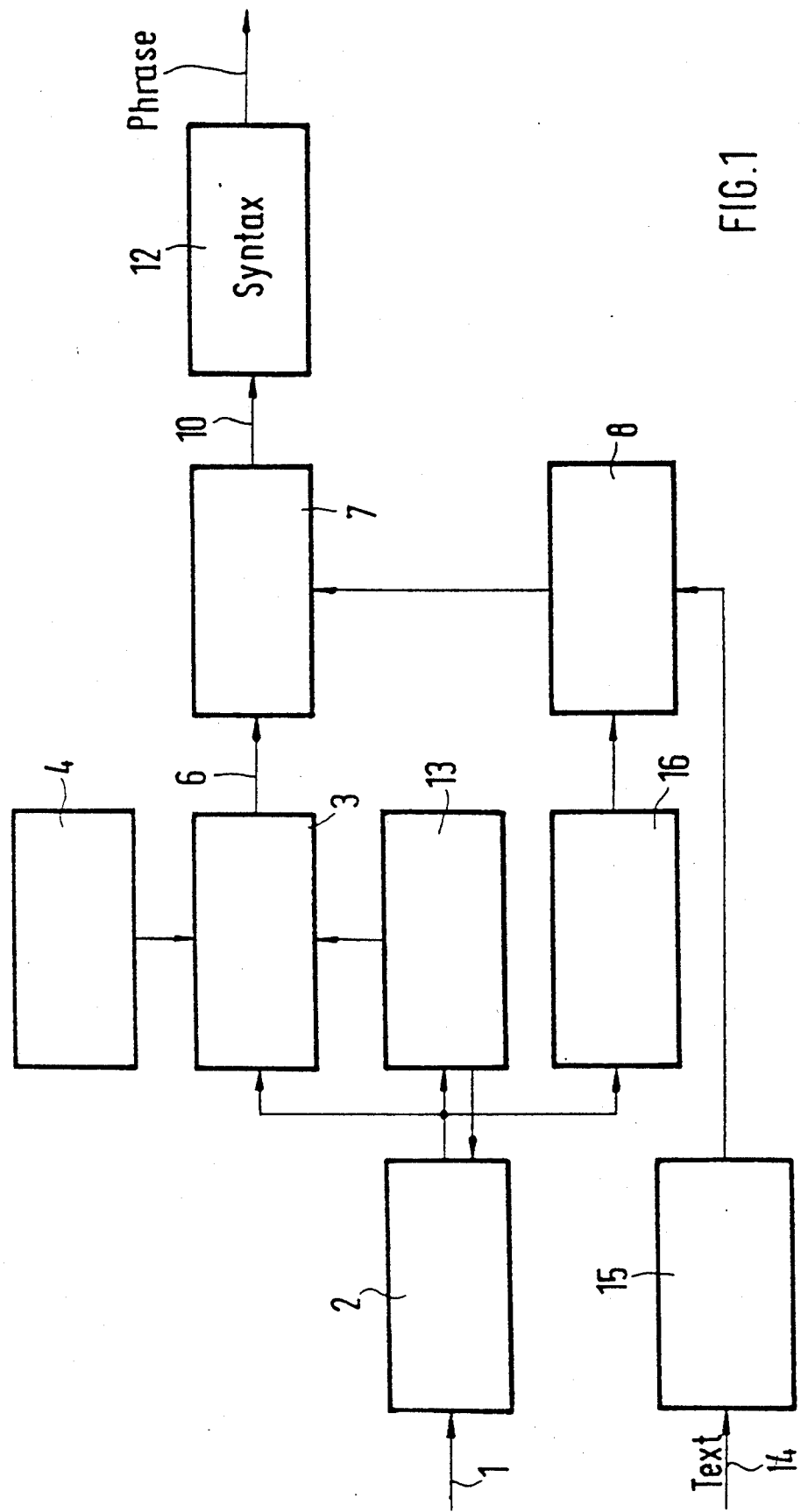
FIG. 1, a function diagram showing the modular structure of the method according to the invention.

For a speech signal 1 to be recognized, feature vectors are first extracted at 2. Such a feature vector is formed, for example, of filter bank coefficients which characterize the intensities of the various frequency ranges of the signal. Thereafter, the successive feature vectors are automatically segmented and classified at 3, namely into syllable oriented word subunits. Suitable syllable oriented word subunits are, for example, CVC units (CVC stands for consonant cluster—vocalic syllable kernel—consonant cluster) in which each syllable is composed of a vocalic syllable kernel V preceded by syllable-onset and followed by syllable-end consonant sequences or individual consonantal phonemes C. The segmentation and classification 3 of the vector sequences is performed with the aid of a stored supply of word subunits, hereinafter called word subunit inventory 4. The segmentation and classification 3 of the vector sequences results in a net 6 of hypotheses (also called network) of word subunits which is fed to a word recognition unit 7.

A vocabulary 8 includes stored reference patterns for words. In the word recognition step 7 of the method, a network 10 of word hypotheses is regenerated from the hypotheses network 6 composed of word subunits with access to the stored reference patterns. These word hypotheses will generally overlap in continuous speech; from them, the spoken phrase or the spoken sentence is determined in a subsequent syntax step 12.

In a speaker adaptivity method step 13, the speech recognition method is adapted to a new user in a short training phase without the new user having to sample-speak the entire vocabulary. This method step is performed as a hybrid statement, that is, it is employed in the domain of the feature vectors and also in the domain of the word subunits.

The vocabulary 8 employed in the method is compiled by the input of written text 14 and is expanded. The graphemes of this text are automatically converted in a grapheme conversion unit 15 into the word subunit notation of the words employed here. The likewise generated pronunciation variants are also converted into this word subunit notation.

In order to accelerate the search through large vocabularies, a preselection 16 is provided with the aid of which only a selected sub-vocabulary is examined for similarity to the spoken utterance.

Figure 2:
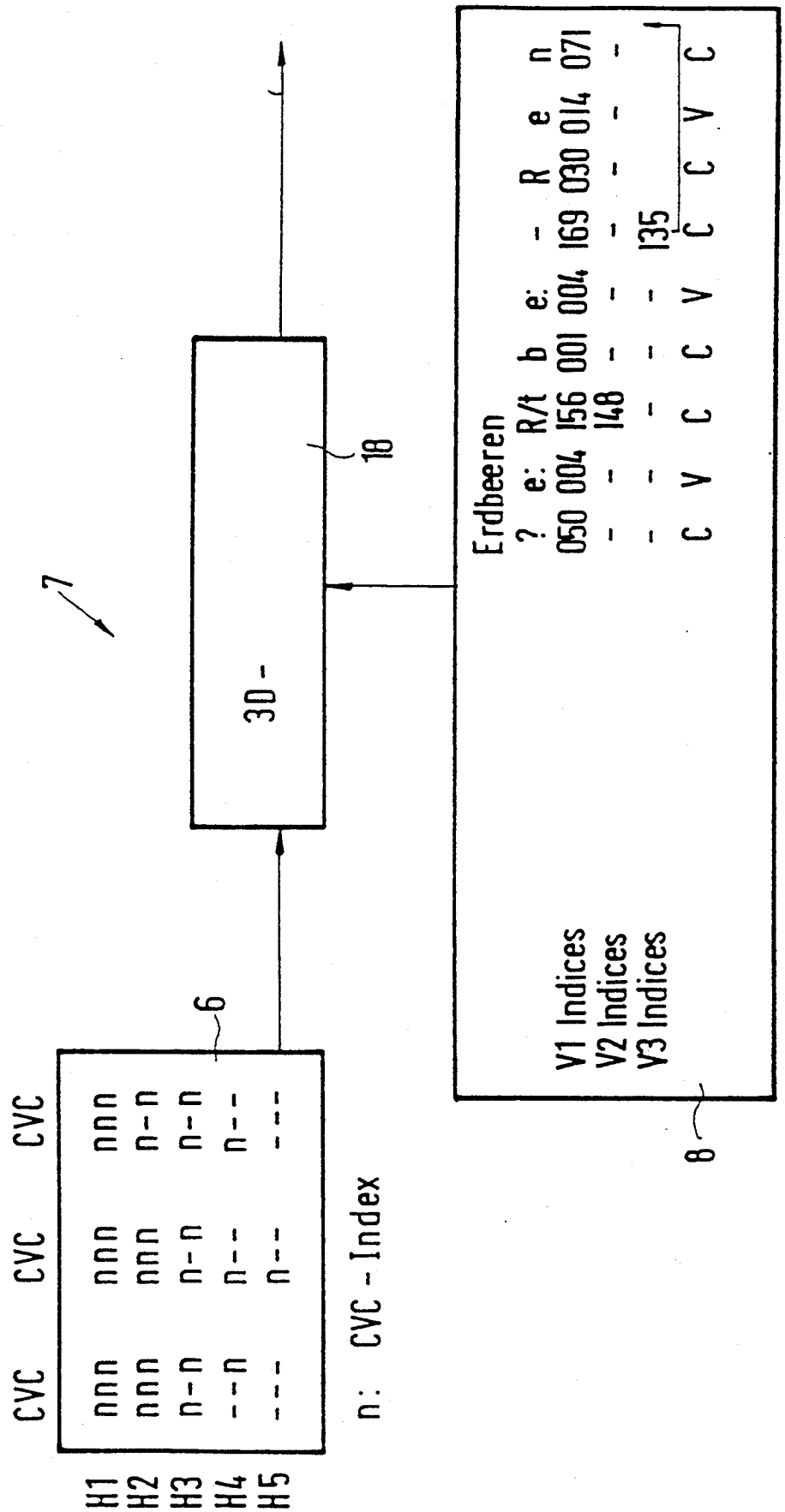
FIG. 2, a diagram to explain the three-dimensional time dynamic comparison for word recognition.

The method steps, or modules, involving word recognition 7 and vocabulary 8 will now be described in greater detail with reference to FIG. 2. Word recognition 7 is performed in that the network 6 of hypotheses from word subunits of the test pattern is compared with the reference patterns in vocabulary 8. In addition to the standard pronunciation of the respective word, pronunciation variants, namely linear variants of individual word subunits or variants involving omitted syllables, are integrated in these reference patterns or word models. This is shown as an example for the vocabulary 8 (FIG. 2) with reference to the word "Erdbeeren" [strawberries]: the standard pronunciation V1 as a three-syllable word, a (linear) variant V2 at one location as well as a skipped syllable variant V3.

A word subunit network is available as a reference pattern from vocabulary 8 and also as a test pattern. Therefore, a three-dimensional time dynamic comparison 18 must be made for the purpose of word recognition in which two dimensions are given by the development over time of test and reference patterns, while the third dimension is defined by the various hypotheses or pronunciation variants per word subunit.

Although speech recognition methods are already known which employ a three-dimensional comparison, they at most process two alternatives per word subunit and are based, in particular, on a segmentation of the speech signals into sequences of phonemes. This results in a quite considerable number of possible associations. The syllable oriented word subunits employed in the method according to the invention, however, offer the advantage that in a time dynamic pattern adaptation, only insertions or omissions of entire syllables can occur, for example from a vowel to the syllable-end consonant sequence of the next syllable (CVC/CVC becomes CVC). This results in a considerable limitation of the possible associations compared to the prior art methods.

In order to automatically compile the vocabulary and expand it from a written text, the orthography—also called spelling or grapheme sequence—of a new word is converted into a sequence of indices of syllable oriented word subunits. These word subunits correspond to the indices of the elements of inventory 4 which is employed in word recognition unit 7 as a reference for the classification of the acoustic or spoken word subunits. During the training phase, the reference word subunits are obtained from marked speech data which contain all occurring word subunits. An entry of a word into the vocabulary thus includes, in addition to orthography, number of syllables, etc., also sequences of indices for standard pronunciation and pronunciation variants. During word recognition, these index sequences are compared with the network of hypotheses from word subunits—which are also present in index form—(FIG. 2). Here, the decisive factor is the compatibility between processing of the speech signal into word subunits and the conforming analysis of the written text.

In order to take into consideration the high variability of pronunciation of a single user and most of all the pronunciation of different users, it is additionally of an advantage with respect to reliable speech recognition, to consider pronunciation variants. With extensive vocabularies, only the automatic generation of such pronunciation variants with the aid of phonological rules is practicable.

In order to accelerate the search process in extensive vocabularies, a preselection 18 is employed (FIG. 3), with the aid of which only a selected sub-vocabulary is examined for similarity with the spoken utterance. The preselection is based on a classification 19 according to "coarse" syllable oriented word subunits and a "coarse" and robust search (word recognition) 20 in a vocabulary 21 which includes correspondingly "coarsely" coded entries. The reference material for an identification of the coarse word subunits, a so-called coarse inventory 22, is generated by class formation from inventory 4 which includes all word subunits. Classification is effected separately according to the type of the word subunit, for example by vowels, syllable-onset or syllable-end sequences of consonants. Acoustically similar word subunits are here combined into so-called clusters. This may occur, for example, selectively by means of an acoustical evaluation, by a determination of disjunctive sub-quantities on the basis of similarity or confusion matrixes and/or with the aid of known clustering methods.

Thus, the intermediate result after coarse classification corresponding to the coarse reference inventory is composed of a sequence 24 of coarse word subunits. From this sequence 24, the coarse word recognition module 20 determines a sub-vocabulary 25 including the best-matching word candidates. Their word models, that is, their word subunit notations, for standard pronunciation and pronunciation variants are utilized in word recognition unit 7 for a comparison with the network of hypotheses 6 and another selection 16 is made.

In contrast to all prior art methods, the described preselection is suitable for a fast preselection of a sub-vocabulary in the recognition of individual words as well as of connected speech since the generation of word candidates is reduced to the onsets of syllables and thus generates a manageable quantity of hypotheses.

It will be understood that the above description of the present invention is susceptible to various modifications, changes and adaptations, and the same are intended to be comprehended within the meaning and range of equivalents of the appended claims.

What is claimed is:

1. A method for recognizing spoken words of a speech, comprising the steps of:
   extracting feature vectors from a speech signal corresponding to a spoken phrase to be recognized;
   segmenting and classifying the successive extracted feature vectors into syllable oriented word subunits by means of a stored supply of word subunits to form a set of hypotheses;
   comparing the set of hypotheses formed from the segmented and classified word subunits with standard pronunciations and pronunciation variants of a plurality of words stored in a reference pattern vocabulary over a three-dimensional time dynamic period to generate a set of word hypotheses; and
   subjecting the generated set of word hypotheses to syntactic analysis in order to determine the spoken phrase.

2. A method according to claim 1, wherein the speech is continuous and the comparing step generates overlapping word hypotheses, the step of subjecting the generated set of word hypotheses to syntactic analysis enabling the spoken phrase to be determined.

3. A method according to claim 1, further comprising the step of adapting the stored reference pattern vocabulary of speech data to a new speaker by means of a hybrid statement based on spoken utterances made during a brief training phase for this new speaker.

4. A method according to claim 3, wherein the adapting step includes adapting the feature vectors as well as the stored word subunits to the new speaker.

5. A method according to claim 1, further comprising the steps of compiling and expanding the stored reference pattern vocabulary by inputting written text and converting this text on the basis of syntactic rules into symbols for word subunits.

6. A method according to claim 1, further comprising the step of preselecting a sub-vocabulary of the stored reference pattern vocabulary with the aid of the stored syllable oriented word subunits in order to accelerate recognition of speech with large stored vocabularies.

7. A method according to claim 1, wherein the feature vectors extracted from a speech signal are based on intensities of various frequency ranges present in the signal.

8. A method according to claim 1, wherein the pronunciation variants include a group consisting of: linear variations of individual word subunits, variations which omit a syllable of a word, and variations which insert an additional syllable to a word.

* * * * *